June 16, 1925.

F. SETTE 1,542,102

VALVE

Filed July 31, 1922

Friederich Sette
INVENTOR.

BY
Erwin, Wheeler & Woolard
ATTORNEYS.

Patented June 16, 1925.

1,542,102

UNITED STATES PATENT OFFICE.

FRIEDERICH SETTE, OF IRON RIDGE, WISCONSIN, ASSIGNOR OF ONE-FOURTH TO FRANCES SETTE AND ONE-FOURTH TO MADIA SETTE, BOTH OF MILWAUKEE, WISCONSIN.

VALVE.

Application filed July 31, 1922. Serial No. 578,831.

*To all whom it may concern:*

Be it known that I, FRIEDERICH SETTE, a citizen of the United States, residing at Iron Ridge, county of Dodge and State of Wisconsin, have invented new and useful Improvements in Valves, of which the following is a specification.

This invention relates to valves.

Objects of this invention are to provide a valve of compact formation, to provide a valve which may be readily locked against opening, to provide a valve which is self closing, and to provide a valve in which the major portion of its parts are housed.

Further objects are to provide a valve of extremely simple construction, employing a minimum number of parts; and to provide a valve which may be cheaply and readily manufactured.

An embodiment of the invention is shown in the accompanying drawing in which.

Figure 1:
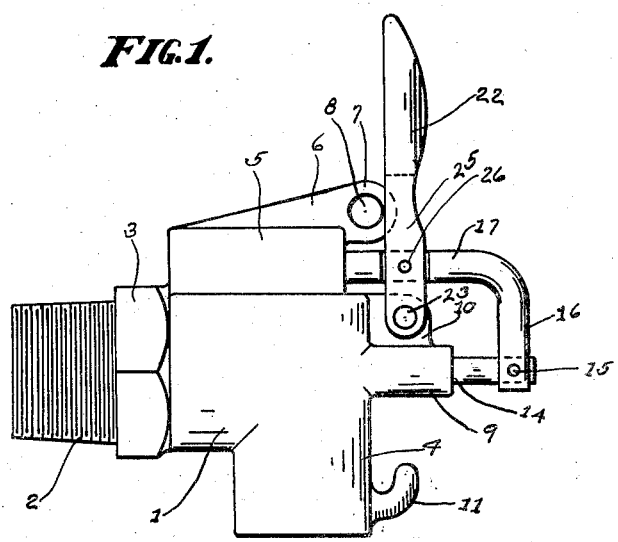
Fig. 1 is a side view of the valve.
Figure 3:
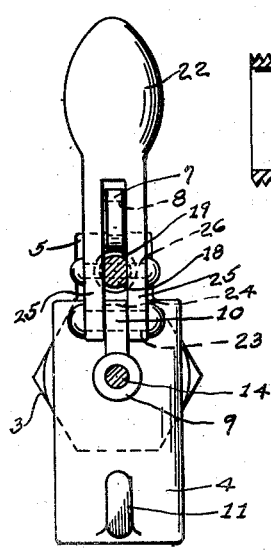
Fig. 3 is an end view of the valve.

The valve contemplated by this invention may be used for a variety of purposes, such for example, as a gasoline controlling valve, a valve for use in dairies for controlling the flow of milk, or, in fact, in a great number of other capacities. The valve chosen for illustration is one which may be readily employed for dispensing gasoline.

The valve comprises a body portion 1 having a threaded rear portion 2 adapted to be screwed into the pipe or container and an intermediate hexagonal portion 3 which may be gripped by the wrench. From the body portion, a downwardly extending tubular discharge portion 4 extends and from the upper side of such body portion a protuberance or enlargement 5 projects upwardly and terminates in a fin 6 provided with an outwardly projecting ear 7, such ear being perforated as indicated at 8. The forward portion of the body part is provided with an elongated boss 9, a web 10 connecting such boss and body portion, and may be provided with an upwardly extending finger or hook 11 for retaining any desired article, such for example, as a pail or the eye portion of a hose supporting device.

The movable portion of the valve comprises a valve proper 12 of conical formation conforming exactly to the conical contour of the valve seat 13. This valve is operated through the medium of a rod 14 which extends outwardly through the forward boss 9 and is joined by means of a pin 15 to the downwardly extending portion 16 of a rod 17 mounted in parallel relation to the rod 14. This last mentioned rod 17 has a squared or flattened intermediate portion 18 and terminates in a plunger 19, such plunger loosely fitting a cylindrical cavity 20 formed in the upper boss or protuberance 5. A helical spring 21 is positioned within this cavity and bears at one end against the end wall of such cavity and at its other end against the plunger 19, thereby serving to move the rod 17, and consequently the rod 14, outwardly, tending, therefore, to close the valve. A manually operable lever having a thumb portion 22 is pivotally mounted by means of a pin 23 upon the web 10. It will be noted that the aperture 24 for receiving the pin 23 is elongated so as to allow a slight up and down motion of the pin as the lever is rocked. It is to be noted that the lever is bifurcated at its lower portion, thereby providing a pair of arms 25 which straddle the web 10. These arms 25 also straddle the flattened portion 18 of the rod 17 and are pivotally joined thereto by means of the pin 26. It is to be noted that the ear 7 projects between the arms 25 and does not interfere with the normal operation of the lever.

Figure 2:
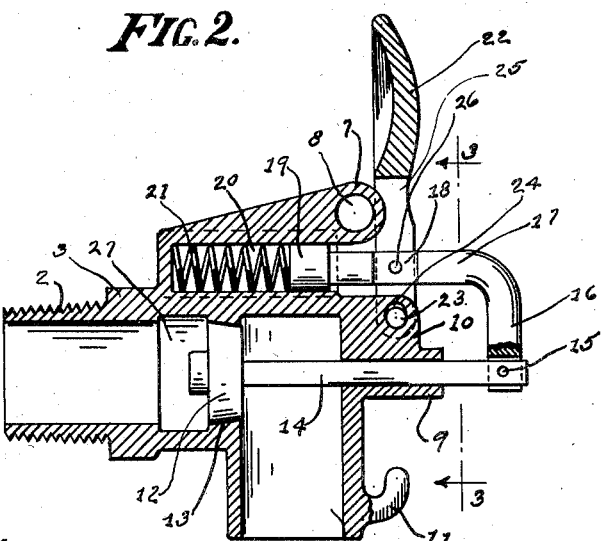
Fig. 2 is a vertical sectional view of the valve.

The operation of the device is as follows: When it is desired to open the valve the manually operable lever is pressed to the left in Figs. 1 and 2, thereby compressing the spring 21 and forcing the parallel rods 17 and 14 to the left, in consequence of which, the valve 12 is unseated and is moved into the relatively large clear space or cavity 27, thereby allowing the fluid to freely flow around such valve and through the discharge portion 4. When the lever is released, the spring 21 expands, thereby forcing the rod 17 outwardly and consequently seating the valve through the medium of the rod 14.

It sometimes becomes desirable to lock these valves against opening. This is readily accomplished by passing the bail of an ordinary padlock through the aperture 8 in the ear 7. When this is done, the bail portion will contact with the rear faces of the legs 25 of the lever and prevent rearward motion thereof.

It will thus be seen that a manually operable, self-restoring, or closing, valve has been provided which is of extremely compact formation; which may be cheaply and readily manufactured; and which may be locked against unauthorized opening.

I claim:

1. In a valve including a unitary body portion having a passageway therethrough, a valve seat in said passageway, and a valve adapted to co-operate with said valve seat, the combination with a valve stem on said valve and projecting outwardly of said body portion, of a rod having a portion thereof substantially parallel to said valve stem and having one end secured thereto, a plunger on the other end of said rod, said body portion being provided with a cylindrical aperture closed to one and surrounding said plunger, a spring interposed between the closed end of said aperture and said plunger, and a lever pivoted intermediate its ends to an intermediate portion of said rod and at one end to said body portion.

2. A valve comprising a body portion having a valve seat formed therein, a valve adapted to co-operate with said seat, a valve stem extending from said valve to the exterior of said body portion, a rod connected with said valve stem, and extending in spaced parallel relation thereto, a spring interposed between said body portion and said rod to normally maintain said valve in closed position, said rod having a bearing in said body portion, a manually operable lever pivotally connected with said body portion and with said rod intermediate the ends thereof, said lever being adapted to compensate for variation of the distance between said pivotal connections.

3. A valve comprising a casing having a valve seat formed therein, a valve adapted to co-operate with said seat, a valve stem extending from said valve to the exterior of said casing and provided with a bearing therein, a rod connected at one end with said valve stem and extending in parallel relation thereto and having a bearing at its other end in said casing, a spring interposed between said casing and a portion of said rod to normally maintain said valve in closed position, a manually operable lever slotted to receive a portion of said casing and an intermediate portion of said rod for pivotal connection thereto respectively, and an apertured ear in the path of said lever, said lever having its slot adapted to receive said ear and the aperture in said ear being adapted to receive the bail of a padlock, whereby to lock said valve in closed position.

FRIEDERICH SETTE.